US008627304B2

(12) United States Patent
Nuzman et al.

(10) Patent No.: US 8,627,304 B2
(45) Date of Patent: Jan. 7, 2014

(54) VECTORIZATION OF PROGRAM CODE

(75) Inventors: Dorit Nuzman, Haifa (IL); Ira Rosen, Haifa (IL); Ayal Zaks, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1035 days.

(21) Appl. No.: 12/510,272

(22) Filed: Jul. 28, 2009

(65) Prior Publication Data

US 2011/0029962 A1 Feb. 3, 2011

(51) Int. Cl.
*G06F 9/45* (2006.01)
(52) U.S. Cl.
USPC ............................................ 717/160; 717/151
(58) Field of Classification Search
USPC .......................................................... 717/160
See application file for complete search history.

(56) References Cited

U.S. PATENT DOCUMENTS

| | | | |
|---|---|---|---|
| 6,192,515 B1 | 2/2001 | Doshi et al. | |
| 6,363,470 B1 | 3/2002 | Laurenti et al. | |
| 7,237,229 B2 | 6/2007 | Ogawa et al. | |
| 7,386,842 B2 * | 6/2008 | Eichenberger et al. | ........ 717/150 |
| 7,415,601 B2 | 8/2008 | May et al. | |
| 2004/0003381 A1 * | 1/2004 | Suzuki et al. | .................. 717/150 |
| 2008/0052693 A1 * | 2/2008 | Archambault et al. | ........ 717/151 |
| 2008/0307402 A1 | 12/2008 | Eichenberger et al. | |

FOREIGN PATENT DOCUMENTS

EP 1115059 A2 7/2001

OTHER PUBLICATIONS

Fusion Utilities http://www-rocq.inria.fr/~pop/doc/lno/fusion.txt.
Fellahi et al., "Software Pipelining in Nested Loops With Prolog-Epilog Merging", 2009 http://www.springerlink.com/content/y26423776t2r88v1/.
Rade Kutil, A Single-Loop Approach to SIMD Parallelization of 2D Wavelet Lifting, IEE, 2006 http://ieeexplore.ieee.org/Xplore/login.jsp?url=/ielx5/10741/33865/01613303.pdf?arnumber=1613303.
A. Eichenberger et al., "Vectorization for SIMD Architectures With Alignment Constraints", http://portal.acm.org/citation.cfm?id=996853&dl=GUIDE&coll=GUIDE&CFID=23248689&CFTOKEN=66409807.
Hoseok Chang, Wonyong Sung, "Efficient vectorization of SIMD programs with non-aligned and irregular data access hardware", CASES 2008.
M. Alvarez et al., "Performance Impact of Unaligned Memory Operations in SIMD Extensions for Video Codec Applications", ISPASS 2007.

\* cited by examiner

*Primary Examiner* — Henry Tsai
*Assistant Examiner* — John Roche
(74) *Attorney, Agent, or Firm* — F. Jason Far-hadion; Century IP Group

(57) ABSTRACT

A method for vectorization of a block of code is provided. The method comprises receiving a first block of code as input; and converting the first block of code into at least a second block of code and a third block of code. The first block of code accesses a first set of memory addresses that are potentially misaligned. The second block of code performs conditional leaping address incrementation to selectively access a first subset of the first set of memory addresses. The third block of code accesses a second subset of the first set of memory addresses starting from an aligned memory address, simultaneously accessing multiple memory addresses at a time. No memory address belongs to both the first subset and the second subset of memory addresses.

12 Claims, 12 Drawing Sheets

```
L0:     for (i=0; i<N; i++) {                                  /* Loop count = N */
            *p++ = 0;
        }

L1:     for (i=0; (p&(VS-1)) != 0; i++) {                       /* Loop count = N1 */
            *p++ = 0;
        }

L2:     for ( ; i<N-VF+1; i+=VF, p+=VS) {                       /* Loop count = N2 */
            *p[0:VF-1] = {0,...,0};
        }

L3:     for ( ; i<N; i++) {                                     /* Loop count = N3 */
            *p++ = 0;
        }
```

*FIG. 3A*

```
L1:     for (i=0; (p&(VS-1)) != 0; i++) {   /* Loop count = N1 */
            *p++ = 0;
        } p0 = p;
p = p+(VS*((N/VF)-1)));
L3:     for ( ; i<VF; i++) {                /* Loop count = N3 */
            *p++ = 0;
        } p = p0;
L2:     for ( ; i<N-VF+1; i+=VF, p+=VS) {   /* Loop count = N2 */
            *p[0:VF-1] = {0,....,0};
        }
```

*FIG. 3B*

```
L13:    p0 = p+(VS-1); p0 = p0&(VS-1);
        for (i=0; (i<VF; i++) {              /* Loop count = VF */
            p = (p&(VS-1) == 0) ? p+S : p;   /* S = VS*N2 */
            *p++ = 0;
        }

L2:     p = p0;
        for ( ; i<N-VF+1; i+=VF, p+=VS) {    /* Loop count = N2 */
            *p[0:VF-1] = {0,....,0};
        }
```

*FIG. 3C*

```
        p0 = p+(VS-1); p0 = p0&(VS-1);
        M = N%VF;
L13:    for (i=0; i<VF; i++) {                    /* Loop count = VF */
            p = (p&(VS-1) == 0) ? p+S : p;        /* S = VS*N2 */
            *p++ = 0;
        }
LL:     for (i=VF; i<VF+M; i++) {
            *p++ = 0;
        }
        p = p0;
L2:     for ( ; i<N-VF+1; i+=VF, p+=VS) {         /* Loop count = N2 */
            *p[0:VF-1] = {0,....,0};
        }
```

*FIG. 3D*

```
        p0 = p+(VS-1); p0 = p0&(VS-1);
        q0 = q+(VS-1); q0 = q0&(VS-1);
L13:    for (i=0; i<VF; i++) {                    /* Loop count = VF */
            p = (p&(VS-1) == 0 ? p+S : p);        /* N2 = N/VF-1 */
            *p++ = 0;                             /*  S = VS*N2  */
            q = (q&(VS-1) == 0 ? q+S : q);
            *q++ = 1;
        } p = p0;
        q = q0;
L2:     for (i=0; i<N2; i++, p+=VS, q+=VS) {    /* Loop count = N2 */
            *p[0:VF-1] = {0,...,0};
            *q[0:VF-1] = {1,...,1};
        }
```

*FIG. 4A*

```
       p0 = p+(VS-1); p0 = p0&(VS-1);
       q0 = q+(VS-1); q0 = q0&(VS-1);
       M = N%VF;
L13:   for (i=0; i<VF; i++) {                    /* Loop count = VF */
           p = (p&(VS-1) == 0 ? p+S : p);        /* N2 = N/VF-1 */
           *p++ = 0;                             /* S = VS*N2 */
           q = (q&(VS-1) == 0 ? q+S : q);
           *q++ = 1;
       }

LL:    for (i=VF; i<VF+M; i++) {
           *p++ = 0;
           *q++ = 1;
       } p = p0;
       q = q0;
L2:    for (i=0; i<N2; i++, p+=VS, q+=VS) {      /* Loop count = N2 */
           *p[0:VF-1] = {0,...,0};
           *q[0:VF-1] = {1,...,1};
       }
```

FIG. 4B

```
S0:     *p++ = 0;                                   /* N = Number of statements = 8 */
        *p++ = 0;
        *p++ = 0;
        *p++ = 0;
        *p++ = 0;
        *p++ = 0;
        *p++ = 0;
        *p++ = 0;

VECTORIZATION OF PROGRAM CODE

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of the claimed subject matter to material associated with such marks.

TECHNICAL FIELD

The claimed subject matter relates generally to optimizing code in a computer program, and, more particularly, to vectorization of program code.

Vectorization refers to converting a program loop into vector format to maximize parallel execution of the same instruction on multiple data elements according to a vectorization factor (VF). VF refers to the number of data elements that a computing system is able to access simultaneously.

Referring to exemplary code 1 provided below, an exemplary program loop L0 comprises code for performing an addition operation on N data elements in $\alpha$, one data element per iteration. Vectorization converts the program loop L0 into exemplary vector loop L1 and exemplary epilogue loop L2. Vector loop L1 iterates through the data elements of $\alpha$, VF elements per iteration, until fewer than VF data elements remain. Epilogue loop L2 iterates through the remaining data elements of $\alpha$, one data element per iteration.

EXEMPLARY CODE 1:
```
L0:   for (i=0; i<N; i++) {
          a[i] = a[i] + b[i];
      }
L1:   for (i=0; i<(N-VF+1); i+=VF) {
          a[i:i+VF] = a[i:i+VF] + b[i:i+VF];
      }
L2:   for ( ; i<N; i++) {
          a[i] = a[i] + b[i];
      }
```

SUMMARY

The present disclosure is directed to systems and corresponding methods that facilitate efficient vectorization of program code.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for vectorization of a block of code is provided. The method comprises receiving a first block of code as input; and converting the first block of code into at least a second block of code and a third block of code. The first block of code accesses a first set of memory addresses that are potentially misaligned. The second block of code performs conditional leaping address incrementation to selectively access a first subset of the first set of memory addresses. The third block of code accesses a second subset of the first set of memory addresses starting from an aligned memory address, simultaneously accessing multiple memory addresses at a time. No memory address belongs to both the first subset and the second subset of memory addresses.

A processor in operational relationship with a general purpose computing machine for executing logic code, wherein the execution of the logic code causes the general purpose computing machine to receive a first block of code as input; and convert the first block of code into at least a second block of code and a third block of code, wherein the first block of code accesses a first set of memory addresses that are potentially misaligned, wherein the second block of code performs conditional leaping address incrementation to selectively access a first subset of the first set of memory addresses, wherein the third block of code accesses a second subset of the first set of memory addresses starting from an aligned memory address, simultaneously accessing multiple memory addresses at a time, wherein no memory address belongs to both the first subset and the second subset of memory addresses.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

FIGS. 3A through 3D illustrate vectorization of an exemplary program loop that accesses memory addresses with a single potential independent misalignment, in accordance with one embodiment.

FIGS. 4A and 4B illustrate vectorization of an exemplary program loop that accesses memory addresses with multiple potential independent misalignments, in accordance with one embodiment.

FIG. 5 illustrates vectorization of a non-loop sequence of statements, in accordance with one embodiment.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Figure 1:
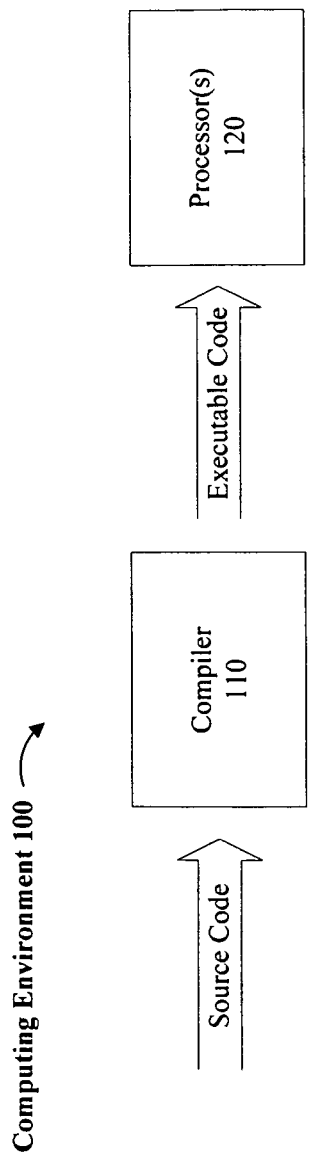
FIG. 1 illustrates an exemplary computing environment, in accordance with one or more embodiments.

Referring to FIG. 1, in accordance with one or more embodiments, an exemplary computing environment 100 may comprise a compiler 110 and one or more processors 120. The compiler 110 may convert, or compile, the source code of a computer program into code that is executable by the processors 120. The compiler 110 may also optimize the code to increase system performance.

Optimizations may include vectorization of a program loop in the code. Vectorization refers to converting a program loop into vector format to maximize parallel execution of the same instruction on multiple data elements according to a vectorization factor (VF). VF refers to the number of data elements that the processors 120 are able to access simultaneously. In certain scenarios, vectorization may be utilized to reduce code size.

In one embodiment, the processors 120 may comprise one or more single instruction multiple data (SIMD) units (not shown). The SIMD units may support fixed-size vector registers, which in turn may impose alignment constraints on memory addresses according to vector size (VS). VS is equal to the product of VF and the size of a data element (i.e., size of a vector register). Thus, a memory address is aligned, if the memory address is a multiple of VS.

Figure 2:
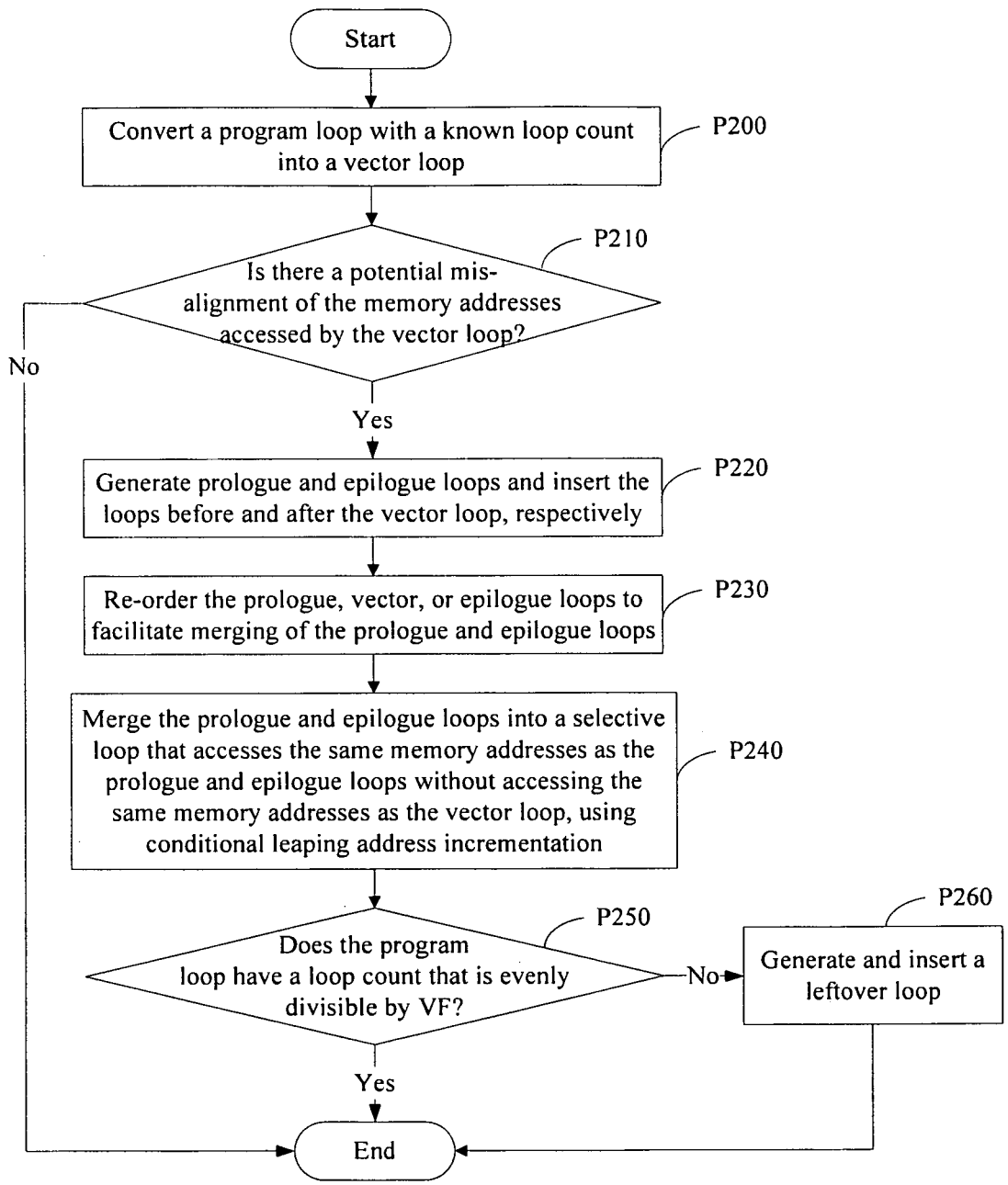
FIG. 2 is a flow diagram of a method for vectorization of a program loop, in accordance with one embodiment.

Referring to FIGS. 1 and 2, in accordance with one embodiment, the compiler 110 converts a program loop with a known number of iterations (i.e., loop count) into a vector loop (P200). A vector loop refers to a loop that simultaneously accesses multiple memory addresses per iteration. For example, during each iteration, a vector loop may store data into or load data from a set of vector registers supported by SIMD units.

If there is a potential misalignment of the memory addresses accessed by the vector loop (P210), the compiler 110 generates prologue and epilogue loops and inserts the loops before and after the vector loop, respectively. (P220). A prologue loop refers to a loop that accesses memory addresses prior to the vector loop in order to align the memory addresses accessed by the vector loop. An epilogue loop refers to a loop that accesses memory addresses remaining after a vector loop is completed.

Referring to FIG. 3A, for example, a program loop L0 with a loop count of N is converted into a prologue loop L1, a vector loop L2, and an epilogue loop L3 with loops counts N1, N2, and N3, respectively. Assume for now that N is known and divisible by VF, but that the alignment of p is unknown at compile time. The loop index so far is indicated by i. The prologue loop L1 performs N1 iterations starting from i=0, accessing memory addresses (i.e., *p++=0) until an aligned memory address is reached (i.e., p&(VS−1)==0). N1 is less than VF, but the exact value is unknown because the amount of the misalignment is unknown at compile time.

In this example, upon reaching the aligned memory address, the vector loop L2 performs N2 iterations, accessing VF memory addresses at a time (i.e., *p[0:VF−1]={0, . . . , 0}) until i is greater than or equal to N−VF+1. If N1 is equal to zero, N2 is equal to N/VF, for example. If N1 is more than zero, N2 is equal to N/VF−1, for example. The value of N2 may therefore depend on N1, which is unknown. Once the vector loop L2 is finished, the epilogue loop L3 performs N3 iterations, accessing memory addresses until i is equal to N. If N1 is equal to zero, N3 is also equal to zero, for example, when N is divisible by VF. If N1 is more than zero, N3 is equal to VF−N1, for example. Since N2 and N3 depend on N1, N2 and N3 are also unknown.

Referring back to FIGS. 1 and 2, since the compiler 110 may not be able to perform further optimizations on loops with unknown loop counts, it is desirable to maximize the number of loops with known loop counts. Accordingly, upon inserting the prologue loop, the compiler 110 re-orders the prologue, vector, or epilogue loops to facilitate merging of the prologue and epilogue loops (P230). In FIG. 3B, for example, epilogue loop L3 is desirably placed immediately after prologue loop L1. It is possible to re-order the loops because the program loop is vectorizable. A loop with a loop count of N is vectorizable if there are no cross-iteration dependences whose distance is more than N or if such dependences may be broken.

Once the loops are re-ordered, the compiler 110 merges the prologue and epilogue loops into a selective loop that accesses the same memory addresses as the prologue and epilogue loops without accessing the same memory addresses as the vector loop, using conditional leaping address incrementation (P240). The selective loop has a known loop count that is equal to VF, for example. Since the loop count of the vector loop is dependent on the loop count of the selective loop, the loop count of the vector loop is also known.

Referring to FIG. 3C, for example, prologue loop L1 is merged with epilogue loop L3 to generate selective loop L13. Loop L13 performs N1 iterations starting from i=0. Upon performing N1 iterations (i.e., reaching an aligned memory address), loop L13 leaps over the memory addresses accessed by vector loop L2 (i.e., p=(p&(VS−1)==0?p+S:p)) and performs N3 iterations. The total loop count for loop L13 is equal to N1+N3, which is equal to VF. Since there are a total of N iterations, N2 is equal to N−VF. Thus, both the loop count of loop L13 and vector loop L2 are known.

Referring back to FIGS. 1 and 2, if the program loop has a loop count that is not evenly divisible by VF (P250), the compiler 110 generates and inserts a loop for leftover iterations (P260). Depending on implementation, the leftover loop may be inserted in different locations (e.g., before or after the vector loop). Alternatively, the leftover loop may be merged with the selective loop, if the conditional leaping address incrementation is performed once. Referring to FIG. 3D, for example, leftover loop LL is similar to the merged loop but does not include the conditional leaping address incrementation sequence. Leftover loop LL performs M (i.e., N mod VF) iterations and thus has a known loop count N.

It should be understood that the processes provided above are not limited to vectorization of a program loop with a known loop count, but may also be applicable to vectorization of a program loop with an unknown loop count. In FIG. 3D, for example, if N is unknown but M is known, merged loop L13 and leftover loop LL have known loop counts but vector loop L2 has an unknown loop count. If both N and M are unknown, selective loop L13 still has a known loop count, but leftover loop LL and vector loop L2 have unknown loop counts. The above processes may also be applicable to vectorization of a scalar program loop or a program loop comprising nested loops.

Additionally, one or more of above processes may be applicable to a program loop that accesses memory addresses with multiple potential misalignments, such that each potential misalignment is mutually independent or has a dependence distance of at least 2*VF. In such a scenario, the compiler 110 directly converts the program loop into the selective loop and the vector loop. In an exemplary embodiment, it may not be possible to generate the prologue loop, if there is more than a single potential independent misalignment.

In FIG. 4A, for example, program loop L0, which has a loop count N that is evenly divisible by VF, is converted into selective loop L13 and vector loop L2. Selective loop L13 comprises a conditional leaping increment sequence for each potential independent misalignment. Referring to FIG. 4B, for example, program loop L0, which has a loop count N that is not evenly divisible by VF, is converted into selective loop L13, leftover loop LL, and vector loop L2. Leftover loop LL is similar to selective loop L13, but does not include the conditional leaping increment sequences.

It is also noteworthy that one or more of the processes provided above may be applicable to a non-loop sequence of statements (e.g., straight-line code, Basic block, or SLP). In such a scenario, the number of statements in the non-loop sequence may be equivalent to the loop count, for example. As illustrated in FIG. 5, program sequence S0 may be converted to selective sequence S13 and vector sequence S2 in an exemplary implementation.

Figure 6:
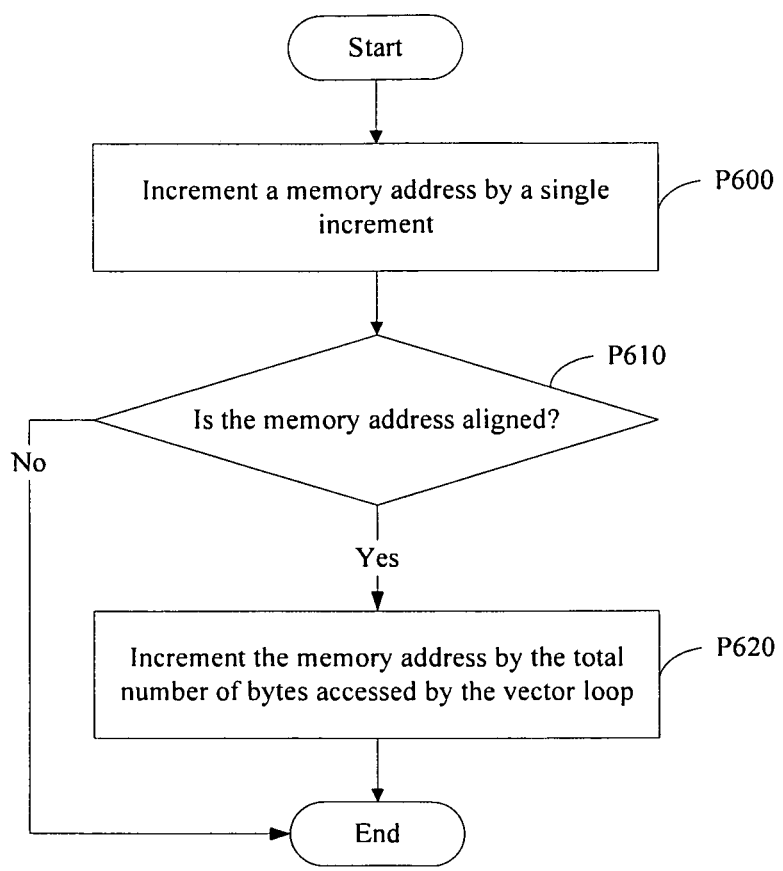
FIG. 6 is a flow diagram of a method for performing conditional leaping address incrementation, in accordance with one embodiment.

Referring to FIG. 6, in accordance with one embodiment, conditional leaping address incrementation is performed by incrementing a memory address by a single element (e.g., 4 bytes) (P600) and determining whether the memory address is aligned (P610). If the memory address is aligned, the memory address is incremented by the total number of bytes accessed by the vector loop (i.e., VS*loop count of the vector loop) (P620).

In one implementation, for example, conditional leaping address incrementation may be performed by the sequence p++; p=(p is aligned?p+S:p), where p is the memory address and S is the total number of bytes accessed by the vector loop. Unfortunately, such a sequence may incur runtime overhead. This problem may be avoided by providing support for performing conditional leaping address incrementation in one instruction.

For example, in one implementation, conditional leaping address incrementation may be performed by implementing a triplet structure having first, second and third values (e.g., {Index, Start, End}), where each subsequent increment Index++ determines if Index has reached End, and, if so, resets Index to Start. In such a scenario, End refers to the address accessed by the first iteration of the vector loop, and Start (usually greater than End) refers to the address accessed by the first iteration of the epilogue loop. In another implementation, the amount of misalignment and the total number of bytes accessed by the vector loop may be provided. In yet another implementation, conditional leaping address incrementation may be implemented within a store or load instruction. It is noteworthy that many architectures already provide partial support for conditional leaping address incrementation (e.g., with a select instruction).

In different embodiments, the claimed subject matter may be implemented either entirely in the form of hardware or entirely in the form of software, or a combination of both hardware and software elements. Referring to FIG. 1, for example, computing environment 100 may comprise a controlled computing system environment that may be presented largely in terms of hardware components and software code executed to perform processes that achieve the results contemplated by the system of the claimed subject matter.

Figure 7:
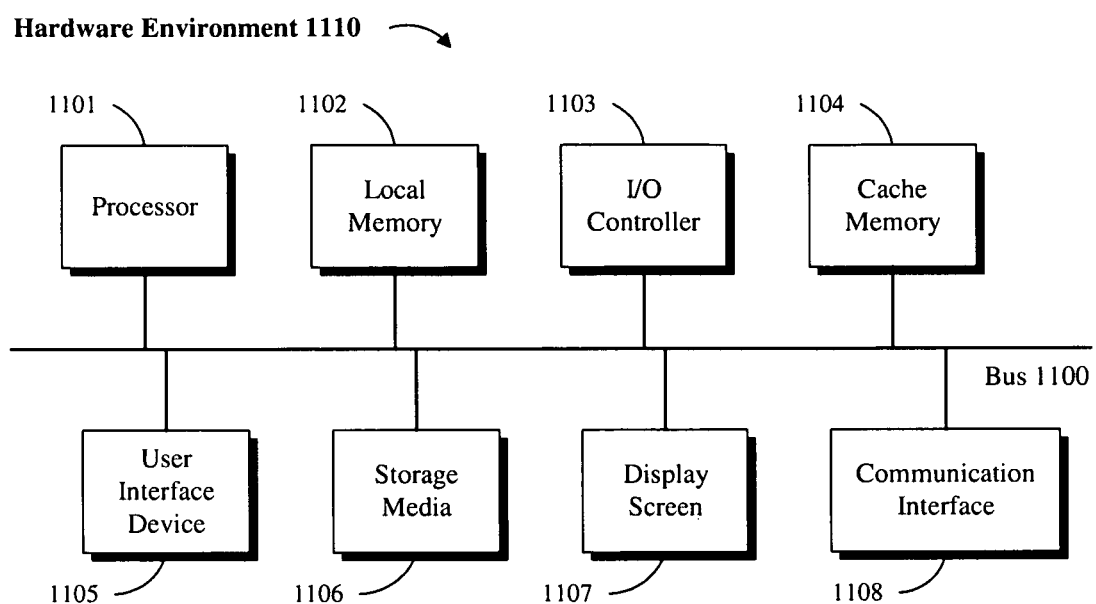
FIGS. 7 and 8 are block diagrams of hardware and software environments in which a system of the present invention may operate, in accordance with one or more embodiments.
Figure 8:
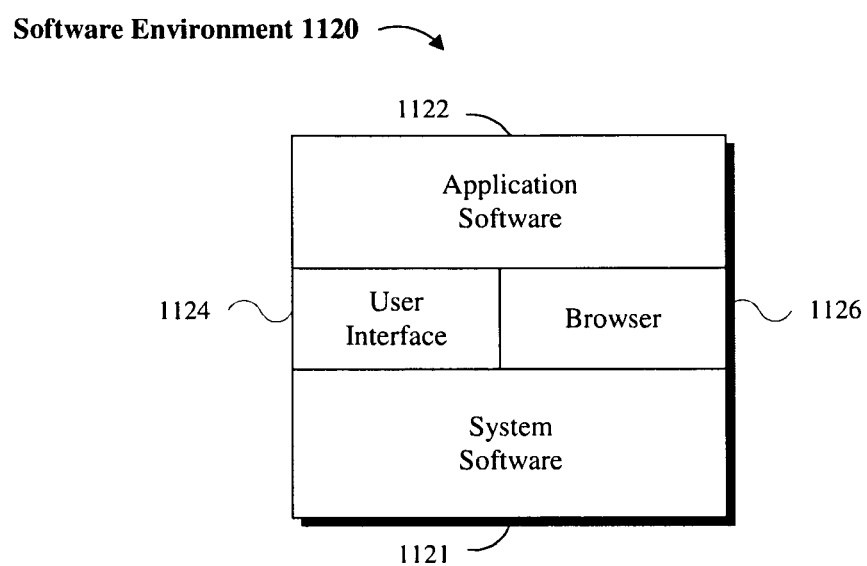

Referring to FIGS. 1, 7, and 8, a computing system environment in accordance with an exemplary embodiment is composed of a hardware environment 1110 and a software environment 1120. The hardware environment 1110 comprises the machinery and equipment that provide an execution environment for the software; and the software environment 1120 provides the execution instructions for the hardware as provided below.

As provided here, software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. In one embodiment, compiler 110 may be implemented as system software 1121 or application software 1122 executed on one or more hardware environments to perform vectorization of a program loop.

System software 1121 may comprise control programs, such as the operating system (OS) and information management systems that instruct the hardware how to function and process information. Application software 1122 may comprise but is not limited to program code, data structures, firmware, resident software, microcode or any other form of information or routine that may be read, analyzed or executed by a processor.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 7, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 8, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on a personal computing system (not shown) and server software is executed on a server system (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective processes of each method are performed are purely exemplary. Depending on implementation, the processes can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A processor in operational relationship with a general purpose computing machine for executing logic code, wherein the execution of the logic code causes the general purpose computing machine to:
receive a first block of code as input, the first block of code including a program loop, wherein the program loop accesses one or more sets of memory addresses and at least one set of memory addresses is associated with a potential independent misalignment;
convert the program loop into prologue, vector and epilogue loops,
re-order the prologue, vector, or epilogue loops to facilitate merging of the prologue and epilogue loops; and
merge the prologue and epilogue loops into a selective loop that performs conditional leaping address incrementation so that the vector loop accesses memory addresses that are aligned,
wherein the conditional leaping address incrementation comprises:
implementing a triplet structure having first, second and third values, wherein the first value is an index value, the second value refers to an address accessed by the first iteration of the epilogue loop, and the third value refers to a memory address accessed by the first iteration of the vector loop;
incrementing a memory address in a first subset of memory addresses by incrementing the first value;
determining whether the memory address is aligned by comparing the first value to the third value; and
incrementing the memory address by a number of memory addresses in a second subset of memory addresses by resetting the first value to the second value, in response to determining that the memory address is aligned,
wherein for the selective loop, the number of iterations during execution of the selective loop is known at compile-time, such that number of loops whose number of iterations will remain a compile-time-known-constant is maximized, and
wherein the number of iterations during execution of the prologue loop and the epilogue loop is unknown.

2. The processor of claim 1, wherein the prologue loop accesses the memory addresses until reaching an aligned memory address.

3. The processor of claim 1, wherein the conditional leaping address incrementation is implemented in a single instruction to reduce runtime overhead.

4. The processor of claim 1, wherein if it is determined that the index value has reached a threshold defined based on the third value, the index value is reset to the second value.

5. A method for vectorization of a block of code, the method comprising:
receiving a first block of code as input, the first block of code including a program loop, wherein the program loop accesses one or more sets of memory addresses and at least one set of memory addresses is associated with a potential independent misalignment;
converting the program loop into prologue, vector and epilogue loops;
re-ordering the prologue, vector, or epilogue loops to facilitate merging of the prologue and epilogue loops;
merging the prologue and epilogue loops into a selective loop that performs conditional leaping address incrementation so that the vector loop accesses memory addresses that are aligned;
implementing a triplet structure having first, second and third values, wherein the first value is an index value, the second value refers to an address accessed by the first iteration of the epilogue loop, and the third value refers to a memory address accessed by the first iteration of the vector loop;
incrementing a memory address in a first subset of memory addresses by incrementing the first value;

determining whether the memory address is aligned by comparing the first value to the third value; and incrementing the memory address by a number of memory addresses in a second subset of memory addresses by resetting the first value to the second value, in response to determining that the memory address is aligned, wherein for the selective loop, the number of iterations during execution of the selective loop is known at compile-time, such that number of loops whose number of iterations will remain a compile-time-known-constant is maximized, and wherein the number of iterations during execution of the prologue loop and the epilogue loop is unknown.

6. The method of claim 5, wherein the prologue loop accesses the memory addresses until reaching an aligned memory address.

7. The method of claim 5, wherein the conditional leaping address incrementation is implemented in a single instruction to reduce runtime overhead.

8. The method of claim 5, wherein if it is determined that the index value has reached a threshold defined based on the third value, the index value is reset to the second value.

9. A system for vectorization of a block of code, the system comprising:

a logic unit for receiving a first block of code as input, the first block of code including a program loop, wherein the program loop accesses one or more sets of memory addresses and at least one set of memory addresses is associated with a potential independent misalignment;

a logic unit for converting the program loop into prologue, vector and epilogue loops; a logic unit for re-ordering the prologue, vector, or epilogue loops to facilitate merging of the prologue and epilogue loops; and a logic unit for merging the prologue and epilogue loops into a selective loop that performs conditional leaping address incrementation so that the vector loop accesses memory addresses that are aligned;

a logic unit for implementing a triplet structure having first, second and third values, wherein the first value is an index value, the second value refers to an address accessed by the first iteration of the epilogue loop, and the third value refers to a memory address accessed by the first iteration of the vector loop;

a logic unit for incrementing a memory address in a first subset of memory addresses by incrementing the first value;

a logic unit for determining whether the memory address is aligned by comparing the first value to the third value; and a logic unit for incrementing the memory address by a number of memory addresses in a second subset of memory addresses by resetting the first value to the second value, in response to determining that the memory address is aligned, wherein for the selective loop, the number of iterations during execution of the selective loop is known at compile-time, such that number of loops whose number of iterations will remain a compile-time-known-constant is maximized, and wherein the number of iterations during execution of the prologue loop and the epilogue loop is unknown, wherein the logic units are executed by one or more processors in the system.

10. The system of claim 9, wherein the prologue loop accesses the memory addresses until reaching an aligned memory address.

11. The system of claim 9, wherein the conditional leaping address incrementation is implemented in a single instruction to reduce runtime overhead.

12. The system of claim 9, wherein if it is determined that the index value has reached a threshold defined based on the third value, the index value is reset to the second value.

* * * * *